United States Patent
Aono

(10) Patent No.: US 9,208,663 B2
(45) Date of Patent: Dec. 8, 2015

(54) INPUT APPARATUS AND CONTROL METHOD FOR INPUT APPARATUS

(75) Inventor: Tomotake Aono, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 55 days.

(21) Appl. No.: 13/884,800

(22) PCT Filed: Nov. 11, 2011

(86) PCT No.: PCT/JP2011/006326
§ 371 (c)(1),
(2), (4) Date: May 10, 2013

(87) PCT Pub. No.: WO2012/063497
PCT Pub. Date: May 18, 2012

(65) Prior Publication Data
US 2013/0222126 A1 Aug. 29, 2013

(30) Foreign Application Priority Data
Nov. 11, 2010 (JP) ................... 2010-252950

(51) Int. Cl.
*G06F 3/041* (2006.01)
*G08B 6/00* (2006.01)
*G06F 3/01* (2006.01)

(52) U.S. Cl.
CPC ........ *G08B 6/00* (2013.01); *G06F 3/016* (2013.01); *G06F 3/041* (2013.01)

(58) Field of Classification Search
CPC .................................. G06F 3/041; G08B 6/00
USPC ............ 340/407.1, 407.2; 341/20, 27, 33, 34; 345/156, 173–175
See application file for complete search history.

(56) References Cited

U.S. PATENT DOCUMENTS

| 6,723,937 B2 | 4/2004 | Englemann et al. |
| 7,205,978 B2 | 4/2007 | Poupyrev et al. |

(Continued)

FOREIGN PATENT DOCUMENTS

| JP | 11-212725 A | 8/1999 |
| JP | 2002-373540 A | 12/2002 |
| JP | 2003-288158 A | 10/2003 |

(Continued)

OTHER PUBLICATIONS

An Office Action; "Notice of Reason for Rejection," issued by the Japanese Patent Office on Nov. 26, 2013, which corresponds to Japanese Patent Application No. 2012-542821 and is related to U.S. Appl. No. 13/884,800; with English language concise explanation.

(Continued)

*Primary Examiner* — Brent Swarthout
(74) *Attorney, Agent, or Firm* — Studebaker & Brackett PC

(57) ABSTRACT

An input apparatus includes a panel (11), a piezoelectric element (13) on the panel (11), an output detection unit (18) that detects output of the piezoelectric element (13) corresponding to pressure on a touch face (11*a*) of the panel (11) and determines whether the output satisfies a standard for providing a tactile sensation, a piezoelectric element drive unit (15) that drives the piezoelectric element (13), when the output is determined to satisfy the standard, so that the tactile sensation is provided to an object pressing the touch face (11*a*), and a control unit (17) that controls the start timing of the determination by the output detection unit (18), thereby, after the piezoelectric element (13) is driven, the control unit (17) controls the output detection unit (18) to resume the determination when a predetermined period elapses after detection of the output by the output detection unit (18) enters a resumable state.

4 Claims, 7 Drawing Sheets

(56) References Cited

U.S. PATENT DOCUMENTS

| | | |
|---|---|---|
| 8,823,662 B2 * | 9/2014 | Aono .......................... 345/173 |
| 2008/0174901 A1 | 7/2008 | Tanimura et al. |
| 2010/0156845 A1 * | 6/2010 | Kim et al. .................... 345/174 |
| 2011/0141046 A1 * | 6/2011 | Sato et al. .................... 345/173 |
| 2011/0261021 A1 * | 10/2011 | Modarres et al. ............ 345/177 |

FOREIGN PATENT DOCUMENTS

| | | |
|---|---|---|
| JP | 2008-130055 A | 6/2008 |
| JP | 2008-199880 A | 8/2008 |

OTHER PUBLICATIONS

International Search Report; PCT/JP2011/006326; Feb. 14, 2012.

* cited by examiner

INPUT APPARATUS AND CONTROL METHOD FOR INPUT APPARATUS

CROSS REFERENCE TO RELATED APPLICATION

This application claims priority to and the benefit of Japanese Patent Application No. 2010-252950 filed on Nov. 11, 2010, the entire contents of which are incorporated herein by reference.

TECHNICAL FIELD

The present invention relates to an input apparatus provided with a panel and to a control method for the input apparatus.

BACKGROUND

In recent years, input apparatuses provided with a panel, such as a touch panel, touch switches or the like, have gained widespread use as input apparatuses that receive input operations from a user through operation units, switches and the like. These input apparatuses are used in mobile terminals such as mobile telephones, information devices such as calculators or ticket vending machines, household appliances such as microwaves, televisions or lighting appliances, industrial equipment (factory automation equipment), and the like.

A variety of types of such panels are known, including a resistive film type, a capacitive type and an optical type. All of these types of panels, however, receive input of a touch by a finger or stylus pen, and unlike push-button switches, the panels themselves are not physically displaced when touched.

Therefore, since the panel itself is not physically displaced when touched, the operator does not obtain any feedback for the touch input even though the input is received. As a result, the operator is likely to provide input repeatedly by touching the same position over and over, which may be stressful for the operator.

In order to prevent such repetitive input, some panels allow for auditory or visual confirmation of input operations by, for example, generating a sound upon receiving touch input or changing the display state by changing the display color of an image displayed on the display unit for an input object, such as an input button, at a position corresponding to the received input.

In the case of auditory feedback, however, confirmation becomes difficult in a noisy environment, and such feedback is not feasible if the apparatus is muted, as during silent mode. Furthermore, with visual feedback, if the size of the input object displayed on the display unit is small, the operator may not be able to confirm the change in display state, particularly when input is provided by finger and the input object is blocked from view by the finger.

A feedback method that is neither auditory nor visual but rather causes the panel to vibrate when the panel receives input, providing the operator's fingertip with a tactile sensation, has also been proposed (for example, see Patent Literature 1 and 2).

CITATION LIST

Patent Literature

1: JP2003-288158(A)
2: JP2008-130055(A)

SUMMARY

The techniques disclosed in Patent Literature 1 and 2, however, merely cause the panel to vibrate when the panel receives input. For this reason, especially if button switches such as push-button switches (push-type button switches) are graphically depicted on the panel and the panel's threshold for receiving input is low, a tactile sensation is provided when a finger or the like lightly touches the panel. This may lead to erroneous operation in response to an unintentional action (touch) before the operator pushes the panel or may provide the operator with a feeling of strangeness due to an unintentional action (touch) before pushing the panel. Here, the panel's threshold for receiving touch input refers to the panel's response threshold, such as the pressure threshold at which an upper conducting film contacts with a lower conducting film in a resistive film type panel, and the threshold for detecting an electrical signal due to a touch in a capacitive type panel.

In order to resolve these problems, the applicant has developed an input apparatus that detects a pressure load on the touch face of the panel and, when the detected load satisfies a predetermined standard for providing tactile sensation, vibrates the touch face. When the detected load satisfies the predetermined standard for providing tactile sensation, this input apparatus provides the pressing object, such as a finger, with a click sensation felt when a push-button switch, such as a metal dome switch, is pushed and buckles.

According to this input apparatus, the click sensation is provided when the operator pushes the touch face and the pressure load satisfies the predetermined standard. As a result, it is possible to allow the operator to perceive reception of input by tactile sensation while reliably preventing erroneous operation and a feeling of strangeness due to the above-described unintentional touch.

To configure such an input apparatus, a load sensor to detect the pressure load on the panel and an actuator to vibrate the panel are required in addition to basic components such as the panel and a control unit. As a result, the number of components and the cost increase, as does the size of the apparatus in order to guarantee the space necessary for the components.

In order to reduce the cost and the size of the apparatus, the applicant has developed an apparatus that uses the direct piezoelectric effect and converse piezoelectric effect of a piezoelectric element serving as both the load sensor that detects the pressure load on the touch face of the panel and the actuator that vibrates the touch face to provide a tactile sensation to the pressing object.

The present invention provides an input apparatus and a control method for the input apparatus that provide an operator with an appropriate tactile sensation without a feeling of strangeness when the operator operates the panel.

In order to achieve the above, an input apparatus according to a first aspect of the present invention includes: a panel; a piezoelectric element mounted on the panel; an output detection unit configured to detect an output of the piezoelectric element corresponding to pressure on a touch face of the panel and to determine whether the output satisfies a standard for providing a tactile sensation; a piezoelectric element drive unit configured to drive the piezoelectric element so that when the output detection unit determines that the output satisfies the standard, the tactile sensation is provided to an object pressing the touch face; and a control unit configured to control a start timing of the determination by the output detection unit, wherein after the piezoelectric element drive unit drives the piezoelectric element, the control unit controls the output detection unit to resume the determination when a predetermined period elapses after detection of the output by the output detection unit enters a resumable state.

A second aspect is the input apparatus according to the first aspect, further including a discharge circuit configured to discharge residual electric charge accumulated in the piezoelectric element, wherein the discharge circuit discharges, in the predetermined period, the residual electric charge accumulated in the piezoelectric element.

A third aspect of the present invention is the input apparatus according to the first aspect, wherein the predetermined period is 40 ms or less.

Furthermore, in order to achieve the above matter, a control method according to a fourth aspect of the present invention is for an input apparatus including: a panel; a piezoelectric element mounted on the panel; an output detection unit configured to detect an output of the piezoelectric element corresponding to pressure on a touch face of the panel and to determine whether the output satisfies a standard for providing a tactile sensation; and a piezoelectric element drive unit configured to drive the piezoelectric element so that when the output detection unit determines that the output satisfies the standard, the tactile sensation is provided to an object pressing the touch face, the piezoelectric element being selectively connected to one of the output detection unit and the piezoelectric element drive unit, the control method including the steps of: while the piezoelectric element is connected to the output detection unit, switching connection of the piezoelectric element from the output detection unit to the piezoelectric element drive unit and driving the piezoelectric element with the piezoelectric element drive unit when the output detection unit determines that the output satisfies the standard; and after driving of the piezoelectric element, switching connection of the piezoelectric element from the piezoelectric element drive unit to the output detection unit and controlling the output detection unit to resume the determination when a predetermined period elapses after detection of the output by the output detection unit enters a resumable state.

According to the present invention, it is possible to use a piezoelectric element as both a load sensor and an actuator to provide an operator with an appropriate tactile sensation without a feeling of strangeness.

BRIEF DESCRIPTION OF DRAWINGS

The present invention will be further described below with reference to the accompanying drawings, wherein.

DESCRIPTION OF EMBODIMENTS

Embodiments of the present invention will be described with reference to the accompanying drawings.

Embodiment 1

Figure 1:
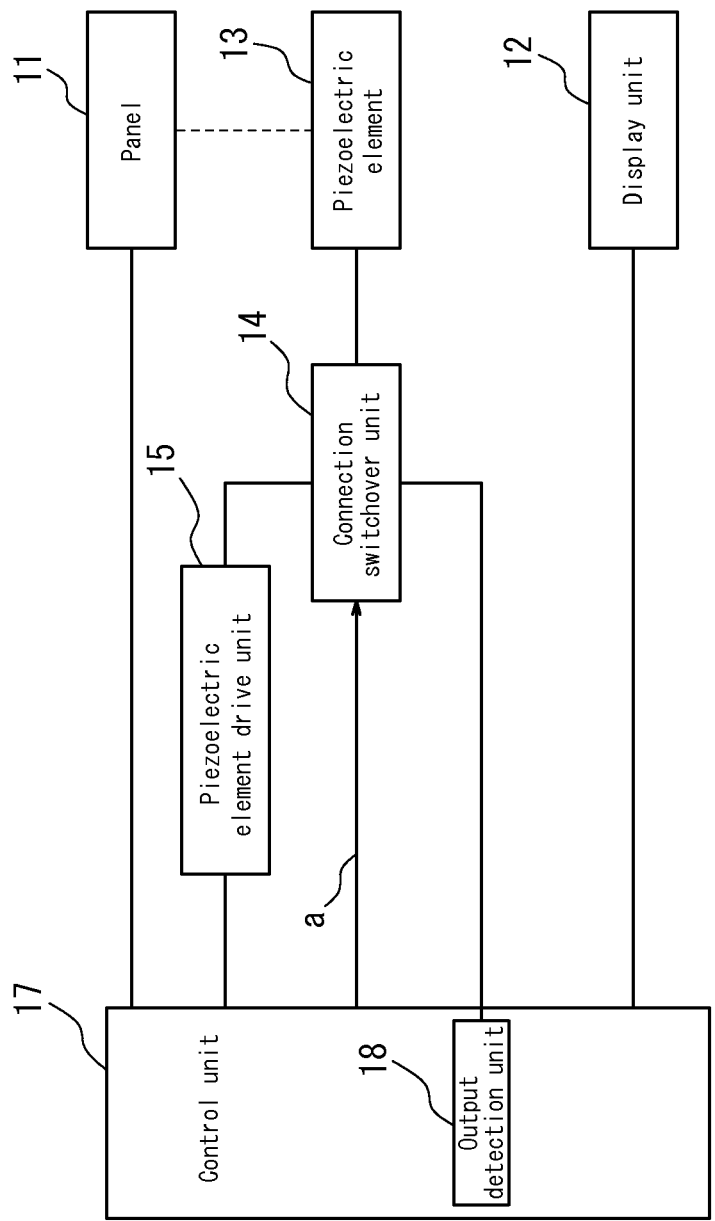
FIG. 1 is a functional block diagram illustrating a schematic configuration of an input apparatus according to Embodiment 1 of the present invention.

FIG. 1 is a functional block diagram illustrating a schematic configuration of an input apparatus according to Embodiment 1 of the present invention. The input apparatus includes a panel (operation panel) 11, a display unit 12, a piezoelectric element 13, a connection switchover unit 14, a piezoelectric element drive unit 15, and a control unit 17 to control operations of each unit.

The panel 11 is connected to the control unit 17 and, under control of the control unit 17, detects a touch input to a touch face of the panel 11 by a pressing object, such as a finger or the like, and provides the control unit 17 with position information of the touch position. The panel 11 may be of a known type, such as a resistive film type, a capacitive type, an optical type or the like, and is disposed on the display unit 12. Note that the panel 11 need not include the above-described touch input detection function.

The display unit 12 is connected to the control unit 17 and, under control of the control unit 17, displays an input object for an input button or the like such as a push-button switch (push-type button switch). The display unit 12 may be constituted by, for example, a liquid crystal display panel, an organic EL display panel or the like. The touch input to the input object displayed on the display unit 12 is detected by the control unit 17 based on the position information output from the panel 11.

The piezoelectric element 13 is mounted on the panel 11 so as to bend (strain) under pressure of the touch face of the panel 11. The piezoelectric element 13 is connected to the connection switchover unit 14 and selectively connected to the control unit 17 or the piezoelectric element drive unit 15 via the connection switchover unit 14.

The connection switchover unit 14 selectively connects the piezoelectric element 13 to the control unit 17 or the piezoelectric element drive unit 15 based on a connection switchover signal from the control unit 17. The piezoelectric element drive unit 15 includes a power amplifier or the like and outputs a predetermined drive signal to vibrate the piezoelectric element 13 under control of the control unit 17.

Being connected to the control unit 17 via the connection switchover unit 14, the piezoelectric element 13 supplies the control unit 17 with a voltage (output signal, output voltage, output) of electric charge generated by pressure on the touch face of the panel 11. Also, being connected to the piezoelectric element drive unit 15 via the connection switchover unit 14, the piezoelectric element 13 is driven by a drive signal supplied from the piezoelectric element drive unit 15. The panel 11 is thus vibrated and provides a tactile sensation to the pressing object pressing the touch face.

The control unit 17 may be, for example, a CPU or the like and include an output detection unit 18 configured to detect the output signal (output voltage) from the piezoelectric element 13 and determine whether the output signal (output voltage) based on the pressure on the touch face of the panel 11 satisfies a standard for providing the tactile sensation. The control unit 17 also controls the operations of each unit based on position information from the panel 11, display information for the display unit 12, a result of determination by the output detection unit 18 and the like. Furthermore, the control unit 17 controls the start timing of the determination by the output detection unit 18.

Figure 2:
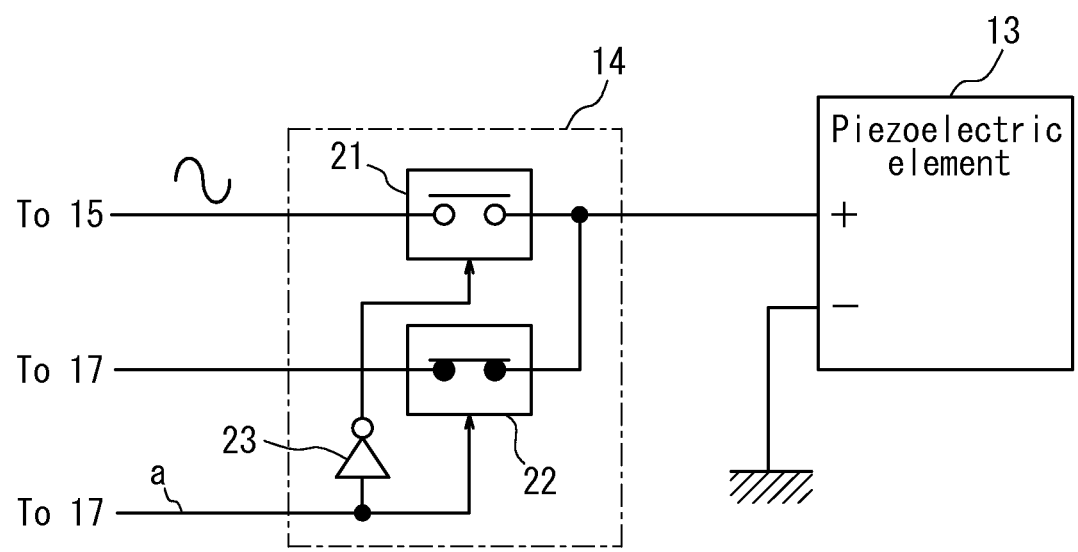
FIG. 2 is a circuit diagram illustrating an example of a configuration of a connection switchover unit illustrated in FIG. 1.

FIG. 2 is a circuit diagram illustrating an example of a configuration of the connection switchover unit 14 illustrated in FIG. 1. The connection switchover unit 14 includes two switch circuits 21, 22, which are semiconductor relays or the like, and an inverter 23. Each of the switch circuits 21, 22 has an ON/OFF contact point. The ON/OFF contact point of the switch circuit 21 is connected between a positive electrode terminal of the piezoelectric element 13 and an output terminal (not illustrated) of the piezoelectric element drive unit 15. The ON/OFF contact point of the switch circuit 22 is connected between the positive electrode terminal of the piezoelectric element 13 and an analogue/digital conversion input terminal (not illustrated) of the control unit 17.

The ON/OFF contact point of the switch circuit 21 is turned ON/OFF by a connection switchover signal a output from the control unit 17 through the inverter 23. The ON/OFF contact point of the switch circuit 22 is turned ON/OFF by the connection switchover signal a. Accordingly, when one of the ON/OFF contact points of the switch circuits 21, 22 is ON, the other is OFF.

Figure 3:
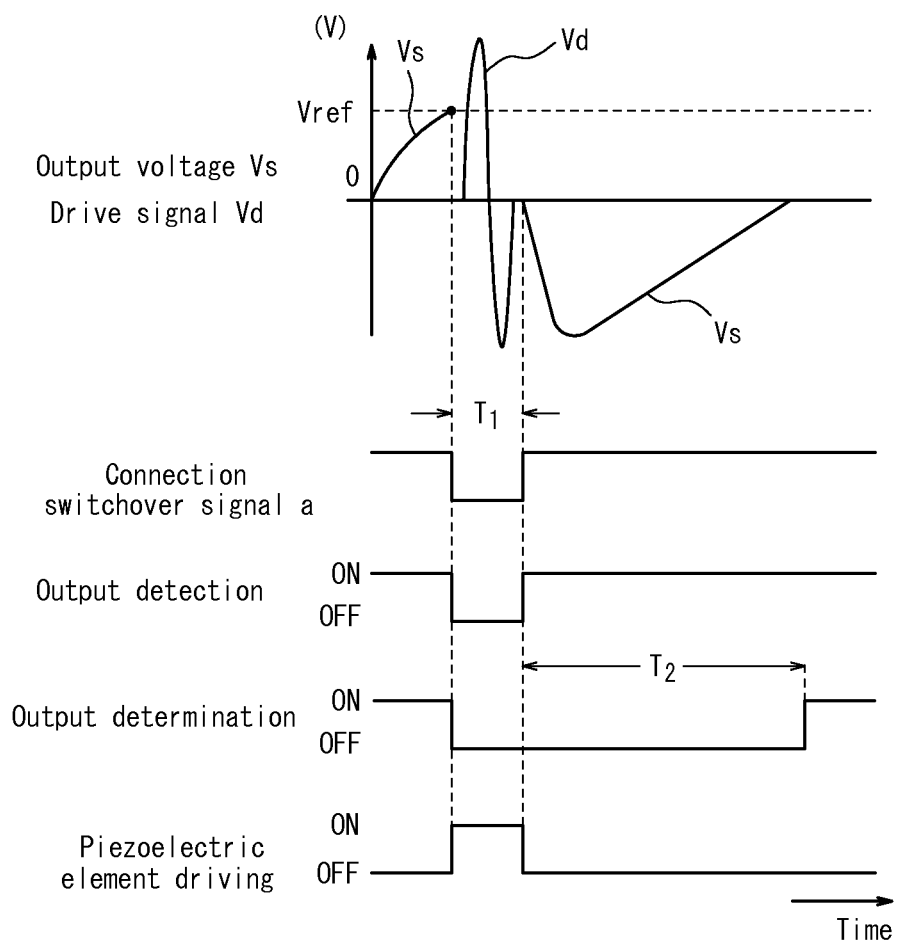
FIG. 3 is a timing chart illustrating a schematic operation of the input apparatus illustrated in FIG. 1.

FIG. 3 is a timing chart illustrating a schematic operation of the input apparatus according to the present embodiment. FIG. 3 illustrates an output signal (voltage) Vs and a drive signal Vd of the piezoelectric element 13, the connection switchover signal a, operation states of output detection (voltage detection) and output determination due to the output detection unit 18, and an operation state of the piezoelectric element 13 due to the piezoelectric element drive unit 15. The control unit 17 sets the connection switchover signal a to a high (H) level. Thereby, the switch circuit 21 of the switchover control unit 14 is turned OFF and the switch circuit 22 ON so that the piezoelectric element 13 is connected to the control unit 17.

In this state, the control unit 17 monitors output of the panel 11. The output detection unit 18 of the control unit 17 detects the output voltage Vs of the piezoelectric element 13 based on pressure on the panel 11. Whether the detected output voltage Vs satisfies the standard for providing the tactile sensation is then determined. The control unit 17 determines that the position information from the panel 11 indicates input to the input object displayed on the display unit 12 and, via the output detection unit 18, that the output voltage Vs of the piezoelectric element 13 has satisfied a standard voltage Vref corresponding to the standard load (for example, 1.5 N) for providing the tactile sensation. The control unit 17 then sets the connection switchover signal a to a low (L) level for a predetermined period $T_1$. Thereby, the switch circuit 21 of the switchover control unit 14 is turned ON and the switch circuit 22 OFF so that the piezoelectric element 13 is connected to the piezoelectric element drive unit 15.

Then, while the piezoelectric element 13 is connected to the piezoelectric element drive unit 15, the control unit 17 controls the piezoelectric element drive unit 15 to output a predetermined drive signal Vd to drive the piezoelectric element 13. The touch panel 11 is thus vibrated and provides a tactile sensation to the pressing object pressing the touch face. The control unit 17 performs predetermined processing on the input object on the display unit 12 such as, for example, changing a display state, displaying a character corresponding to the input object in a predetermined display area, executing an application corresponding to the object, and the like.

Subsequently, when the piezoelectric element drive unit 15 finishes driving the piezoelectric element 13, the control unit 17 sets the connection switchover signal a to the level H at the point at which a predetermined period $T_1$ elapses, thus turning the switch circuit 21 back OFF and the switch circuit 22 back ON. Thereby, the connection of the piezoelectric element 13 is switched from the piezoelectric element drive unit 15 to the control unit 17, so that detection of the output voltage (output signal) by the output detection unit 18 enters a resumable state.

When the predetermined period elapses after detection of the output voltage by the output detection unit 18 enters the resumable state, the control unit 17 causes the output detection unit 18 to resume determining whether the output voltage satisfies the standard. In detail, for example from the point at which the predetermined period $T_1$, in which the connection switchover signal a switches from the level L to the level H, elapses until a predetermined period $T_2$ elapses, the control unit 17 disables (cancels) the output voltage Vs of the piezoelectric element 13 so that determination of whether the output voltage satisfies the standard is not made. Subsequently, from the point at which the predetermined period $T_2$ elapses, the control unit 17 enables the output voltage Vs of the piezoelectric element 13 and causes the output detection unit 18 to resume the determination of the output voltage Vs.

Here, the predetermined period $T_1$ to maintain the connection switchover signal a at the level L may be fixedly set (for example, approximately 10 ms) including a drive time of the piezoelectric element 13 or automatically set based on the drive time by the drive signal corresponding to the tactile sensation to provide. Also, the predetermined period $T_2$, which is a period between driving of the piezoelectric element 13 and resumption of detection of the output voltage by the output detection unit 18, is set to be a sufficient time such that the residual electric charge in the piezoelectric element 13 after driving of the piezoelectric element 13 is nearly discharged, with the output voltage Vs becoming nearly 0 V, and also such that detection of the output based on the load of each input operation among continuous input operations and the like is not prevented. The predetermined period $T_2$ is, for example, 40 ms or less.

As described above, the input apparatus according to the present embodiment uses the direct piezoelectric effect and converse piezoelectric effect of the piezoelectric element 13 in order to use the piezoelectric element 13 as both a load sensor to detect the pressure load on the touch face of the panel 11 and as an actuator to vibrate the touch face so that the tactile sensation is provided to the pressing object. The number of components can thus be reduced, thereby lowering costs as well as reducing the size of the apparatus by requiring less space for provision of components.

Since the output detection unit 18 and the piezoelectric element drive unit 15 are provided to connect selectively to the piezoelectric element 13, the drive signal Vd may be supplied from the piezoelectric element drive unit 15 to the piezoelectric element 13 separately from the output voltage Vs of the piezoelectric element 13. Accordingly, it is not necessary to apply a voltage that is a sum of the output voltage Vs and the drive signal Vd, thereby lowering the working voltage range and allowing for use of various types of piezoelectric elements. Moreover, after driving the piezoelectric element 13, that is after providing the tactile sensation for the first time in accordance with an increase in the pressure load (output voltage) of the touch input, detection of the output voltage enters a resumable state, but the determination of whether the output voltage satisfies the standard is not made until the predetermined period $T_2$ elapses. The determination is resumed at the point at which the predetermined period $T_2$ elapses.

Here, as illustrated in FIG. 3, after it is detected that the output voltage Vs of the piezoelectric element 13 has satisfied the standard voltage Vref and the drive signal Vd is applied to the piezoelectric element 13 to drive it, connection of the piezoelectric element 13 is switched to the output detection unit 18, and the monitored output voltage Vs of the piezoelectric element 13 for example changes as illustrated in FIG. 3 during the predetermined period $T_2$. In other words, whereas the output voltage Vs of the piezoelectric element increases in the direction of positive polarity in response to the start of pressure on the panel 11, the output voltage Vs immediately after driving of the piezoelectric element 13 increases relatively sharply from 0 V in the direction of negative polarity. Subsequently, the stored charge gradually returns to 0 V by self-discharge.

Presumably, such a phenomenon is seen not only when applying the drive signal to provide a click sensation similar to when operating a push-button switch but also, for example, when applying the drive signal to provide a tactile sensation perceived as a continuous vibration or "throbbing".

The input apparatus according to the present embodiment resumes the determination at the point at which the predetermined period $T_2$ elapses, thereby allowing for a reduction in the risk of an unexpected tactile sensation being provided based on the phenomenon of a sharp change in the output voltage after connection of the piezoelectric element 13 is switched to the output detection unit 18. Also, during the predetermined period $T_2$, no tactile sensation is provided even if the pressing object applies a strong pressure such that the standard voltage Vref is exceeded. Therefore, it is possible to provide an operator with an appropriate tactile sensation without a feeling of strangeness due to provision of an unexpected tactile sensation.

Next, (1) a housing structure, (2) the standard of the output voltage for providing the tactile sensation, and (3) the drive signal to drive the piezoelectric element 13 according to the input apparatus of the present embodiment will be described.

(1) Housing Structure

Figure 4A:
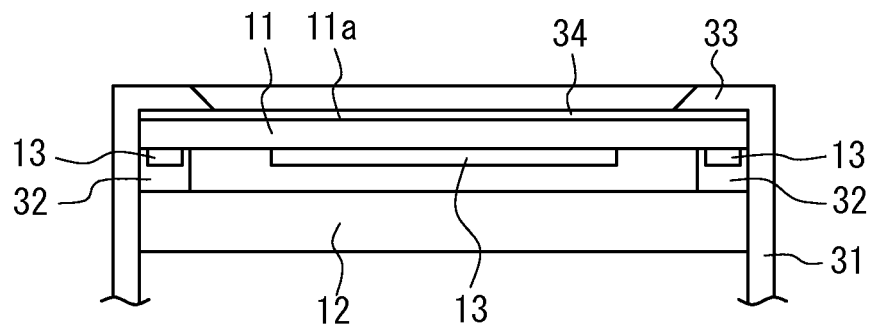
FIG. 4A is a cross-sectional view of a main section illustrating an exemplary housing structure of the input apparatus.
Figure 4B:
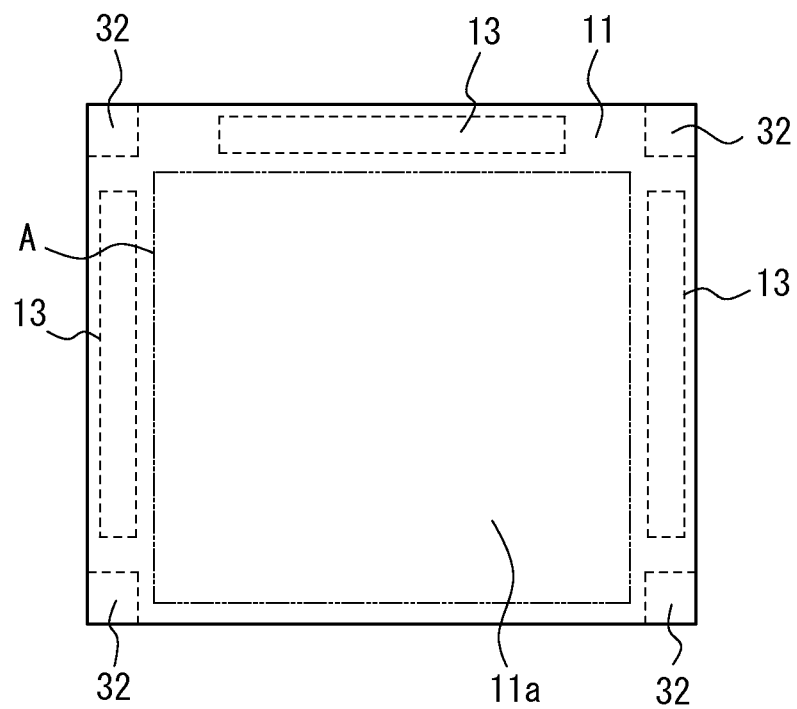
FIG. 4B is a plan view of the main section illustrating an exemplary housing structure of the input apparatus.

FIGS. 4A and 4B illustrate an exemplary housing structure of the panel 11, the display unit 12 and the piezoelectric element 13 illustrated in FIG. 1. FIG. 4A is a cross-sectional view of a main section, and FIG. 4B is a plan view of the main section. The display unit 12 is contained in a housing 31. The panel 11 is held on the display unit 12 via insulators 32 made of elastic members. According to the present embodiment, the panel 11 is held on the display unit 12 via the insulators 32 arranged at four corners outside a display area A of the display unit 12 illustrated by a chain double-dashed line in FIG. 4B.

The housing 31 is provided with an upper cover 33 covering a surface area of the panel 11 outside the display area of the display unit 12. For dust-proofing, an insulator 34 made of an elastic member is arranged between the upper cover 33 and the panel 11.

The panel 11 illustrated in FIGS. 4A and 4B has a surface member with a touch face 11a and may be constituted by, for example, a transparent film or glass, and has a rear face member which may be constituted by glass or acryl. The panel 11 is configured so that when the touch face 11a is pressed via the insulator 34, a pressed part bends (strains) slightly in response to the pressure, and the entire panel 11 including the rear face member bends slightly.

The piezoelectric element 13 is provided on the rear face of the panel 11 at a position covered by the upper cover 33 close to a periphery on one side or each of a plurality of sides. Here, the piezoelectric elements 13 are provided on three sides. These three piezoelectric elements 13 detect the pressure load on the touch face 11a of the panel 11 and vibrate the panel 11 to provide the tactile sensation to the pressing object pressing the touch face 11a. Note that the housing 31, the upper cover 33 and the insulator 34 illustrated in FIG. 4A are omitted from FIG. 4B.

Here, the three piezoelectric elements 13 are connected to the piezoelectric element drive unit 15 via the connection switchover unit 14 and driven by a common drive signal or individual drive signals. The three piezoelectric elements 13 supply the outputs in parallel to the output detection unit 18 via the connection switchover unit 14.

Then, the output detection unit 18 calculates the output signal based on the output signal (voltage) from the three piezoelectric elements 13. The results of calculation of the output signal are preferably approximately the same when the operator feels nearly the same pressure sensation (a feeling of hardness, softness, or the like) at each position on the touch face 11a. To that end, the output detection unit 18 calculates the output signal based on, for example, an average value of the output signals of the three piezoelectric elements 13, a weighted additional value, or the like. Also, it is preferable to apply individual drive signals to the three piezoelectric elements 13 so that the operator obtains nearly the same sense of pressure and nearly the same sense of touch (feeling of texture and the like) at each position on the touch face 11a. Therefore, the piezoelectric element drive unit 15 appropriately changes amplitude, phase and the like of each of the drive signals in accordance with a position and a location on the touch face 11a so that an approximately identical tactile sensation is obtained as a combination of the sense of pressure and the sense of touch.

(2) Standard of Output Voltage

The standard of the output pressure for providing the tactile sensation may be appropriately set in accordance with, for example, the load characteristics during a press of an intended push-button switch. For example, the standard is set to be equal to an output voltage corresponding to a load at which the panel 11 responds to the touch input (synchronizing the timing at which the tactile sensation is provided with the response to the touch input by the panel 11). Alternatively, the standard is set to an output voltage corresponding to a load that is higher than the load at which the panel 11 responds to the touch input (setting the timing at which the tactile sensation is provided to be later than the response to the touch input by the panel 11). For example, when the input apparatus according to the present embodiment is applied to a mobile terminal, the standard is preferably set to be equal to or higher than the output voltage corresponding to the load at which the panel 11 responds to the touch input (setting the timing for providing the tactile sensation to be later than the response to the touch input by the panel 11). Furthermore, the setting of the standard of the output voltage for the load may preferably be set as users desire, so that an elderly user may set a heavier (slower) standard, whereas a user who often texts may set a lighter (quicker) standard.

(3) Drive Signal

The drive signal to drive the piezoelectric element 13 by the piezoelectric element drive unit 15 may be appropriately determined based on the tactile sensation to provide. For example, in order to provide a realistic click sensation "Cli", which is obtained when pressing a push-button switch used in a mobile terminal, the piezoelectric element drive unit 15 drives the piezoelectric element 13 as follows. Upon application of the above standard output voltage, a sine wave, for example, with a constant frequency of 100 Hz to 200 Hz, preferably 170 Hz, is applied for one period to the piezoelectric element 13 as the drive signal, so that the touch face of the panel 11 is vibrated by approximately 15 nm while the standard pressure load is applied thereto. Thereby, it is possible to allow the operator to recognize that an input operation is complete by providing a realistic click sensation through the pressing object (pressing means) pressing the touch face of the panel 11. Similarly, in order to provide another click sensation "Click", which is a sensation harder than the click sensation "Cli", the piezoelectric element drive unit 15 applies, for example, a sinusoidal signal or a square wave signal with a frequency of approximately 200 Hz to 500 Hz for one period to the piezoelectric element 13 as the drive signal.

In order to provide a tactile sensation different from the click sensation, for example a soft tactile sensation such as a "throbbing" sensation or a "jelly-like" sensation, a sine wave, for example, with a frequency of approximately 200 Hz to 500 Hz is applied for two or three periods as the drive signal. Alternatively, in order to provide a "vibrating" sensation, a sine wave, for example, with a frequency of approximately 200 Hz to 500 Hz is applied for four or more periods as the drive signal.

Information on the drive signals for providing these various tactile sensations is preferably stored in a memory unit (not illustrated) so that the user can suitably set the drive signal for providing a desired tactile sensation. It is also preferable, based on the drive signal that is set, to automatically set the period $T_1$, in which the connection switchover signal a is set to the level L.

As described above, the control unit 17 does not drive the piezoelectric element 13 until the load applied to the panel 11 calculated based on the output of the piezoelectric element 13 satisfies the standard for providing the tactile sensation (for example, 1.5 N). The sense of pressure of the operator is thus stimulated. Then, when the load satisfies the standard, the control unit 17 drives the piezoelectric element 13 via the piezoelectric element drive unit 15 with the predetermined drive signal so that the touch face 11a is vibrated to stimulate the sense of touch. Thereby, the tactile sensation is provided to the operator so that the operator recognizes that the input operation is complete. Accordingly, if a button switch such as a push-button switch (push-type button switch), for example, is graphically depicted on the panel, the operator can perform input operations on the panel 11 while feeling the same realistic click sensation as when operating the push-button switch. The operator therefore no longer experiences a feeling of strangeness. Also, since the operator performs the input operation in conjunction with the perception of "having pressed" the panel 11, erroneous input caused by simply tapping the panel 11 is prevented.

In addition, when voltage of the standard for providing the tactile sensation the tactile sensation is set higher than the voltage corresponding to the load at which the panel 11 responds to the touch input (setting the timing for providing the tactile sensation to be later than the response to the touch input by the panel 11), the control unit 17 determines an input position according to a touch operation to the touch face 11a and changes a display state of the input object at a corresponding portion of the display unit 12. Then, when the voltage based on the pressure load on the touch face 11a detected based on the output from the piezoelectric element 13 satisfies the standard for providing the tactile sensation, the control unit 17 drives the piezoelectric element 13 to provide the click sensation and also execute a predetermined operation (for example, execution of a program corresponding to the object) by confirming the input position. In this case, the operator confirms that the input object is selected by seeing a change of the display state of the input object displayed on the display unit 12. Moreover, since the click sensation is provided to the operator upon pressing the touch face 11a, the operator recognizes that the selected input object is accepted (executed). Erroneous inputs by a so-called wandering finger are thus prevented.

Embodiment 2

Figure 5:
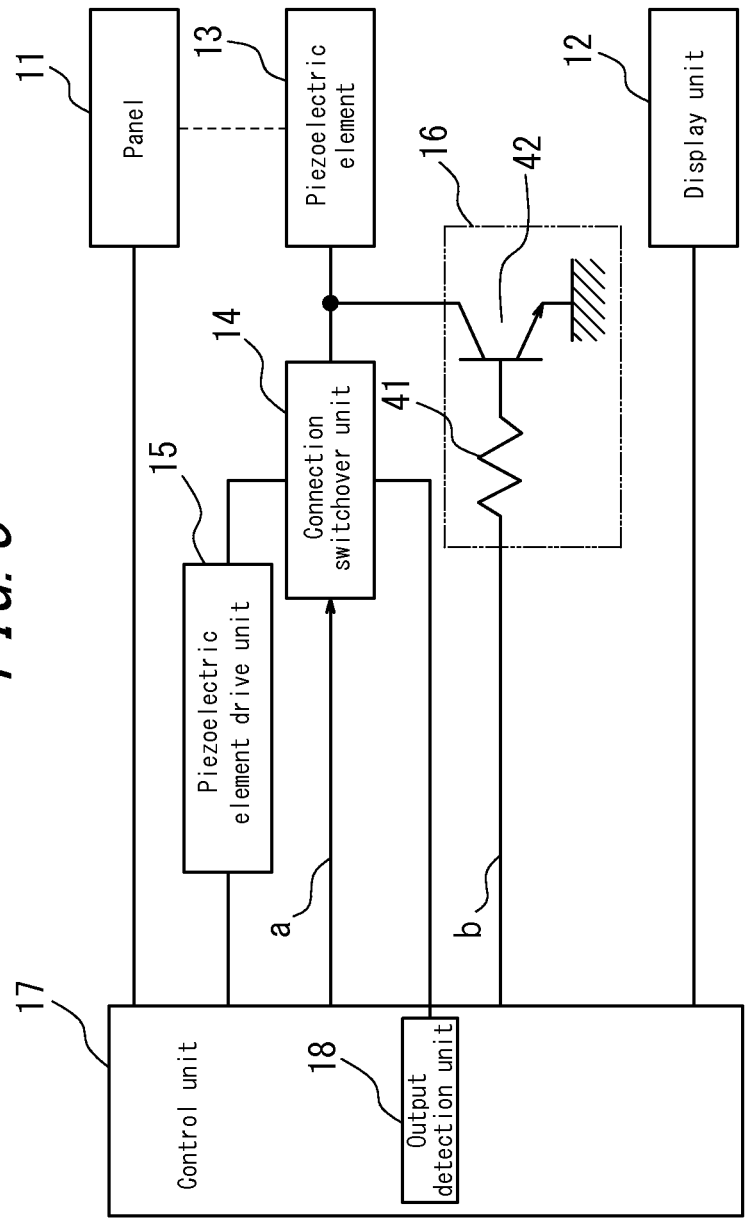
FIG. 5 is a functional block diagram illustrating a schematic configuration of an input apparatus according to Embodiment 2 of the present invention.

FIG. 5 is a functional block diagram illustrating a schematic configuration of an input apparatus according to Embodiment 2 of the present invention. In addition to the configuration illustrated in FIG. 1, this input apparatus has a discharge circuit 16 connected to the piezoelectric element 13. After driving of the piezoelectric element 13, the discharge circuit 16 forces discharge of the residual electric charge remaining in the piezoelectric element 13 to ground.

The discharge circuit 16 has, for example, a resistor 41 and a switching transistor 42 for discharge. The switching transistor 42 has a collector connected to a positive polarity terminal of the piezoelectric element 13 and an emitter connected to ground. In addition, a base of the switching transistor 42 is connected to the control unit 17 via the resistor 41 so that a discharge control signal b is supplied from the control unit 17. The remaining structure is the same as in FIG. 1, and thus components fulfilling the same functions are provided with identical reference signs, with descriptions thereof omitted.

Figure 6:
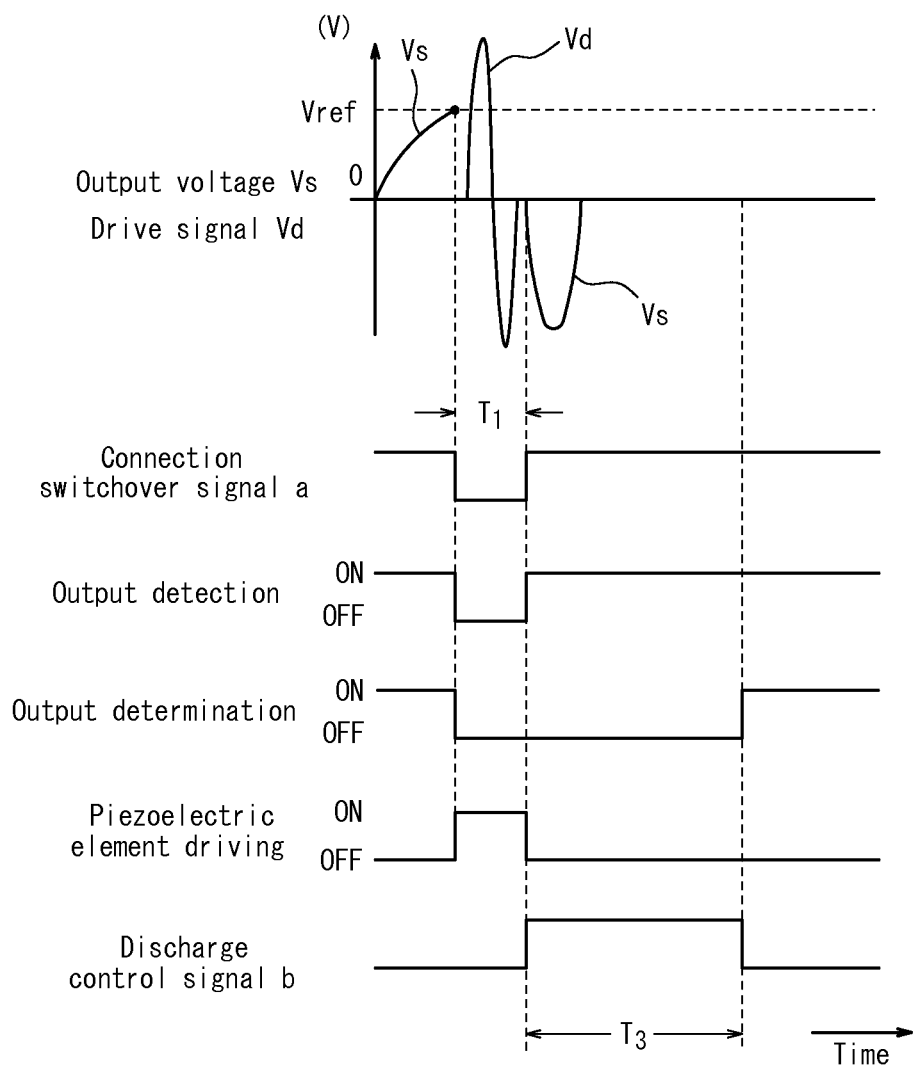
FIG. 6 is a timing chart illustrating a schematic operation of the input apparatus illustrated in FIG. 5.

FIG. 6 is a timing chart illustrating a schematic operation of the input apparatus according to the present embodiment. According to the input apparatus of the present embodiment, after the piezoelectric element drive unit 15 drives the piezoelectric element 13, that is, during a predetermined period $T_3$ after the elapse of the predetermined period $T_1$ for setting the connection switchover signal a to the level L, the discharge control signal b is set to the level H. The switching transistor 42 is thus caused to conduct so that the residual electric charge accumulated in the piezoelectric element 13 is forcibly discharged to ground via a collector-emitter pathway.

In addition, the control unit 17 sets detection of output voltage by the output detection unit 18 to a resumable state at the point at which the predetermined period $T_1$, in which the connection switchover signal a switches from the level L to the level H, elapses. However, the control unit 17 disables (cancels) the output voltage Vs of the piezoelectric element 13 from the point at which the predetermined period $T_1$ elapses until the point at which the predetermined period $T_3$ elapses, so that the determination by the output detection unit 18 of whether the output voltage satisfies the standard is not made. Subsequently, from the point at which the predetermined period $T_3$ elapses, the control unit 17 enables the output voltage Vs of the piezoelectric element 13 and causes the output detection unit 18 to resume the determination of the output voltage Vs of the piezoelectric element 13. Other operations are the same as those in Embodiment 1, and thus a description thereof is omitted.

According to the input apparatus of the present embodiment, as described above, after the piezoelectric element drive unit 15 drives the piezoelectric element 13, the residual electrical charge in the piezoelectric element 13 is forcibly discharged to ground through the discharge circuit 16. Thereby, the predetermined period (discharge period) $T_3$ after driving of the piezoelectric element 13 until resumption of determination of the output voltage by the output detection unit 18 can be set to be shorter than the predetermined period $T_2$ according to Embodiment 1, for example approximately 30 ms. Accordingly, in addition to the effect of Embodiment 1, an effect of appropriately providing the tactile sensation for each input operation is obtained during a so-called battery of input, in which the input operation is continuously performed on the same input object displayed on the display unit 12.

Embodiment 3

Figure 7:
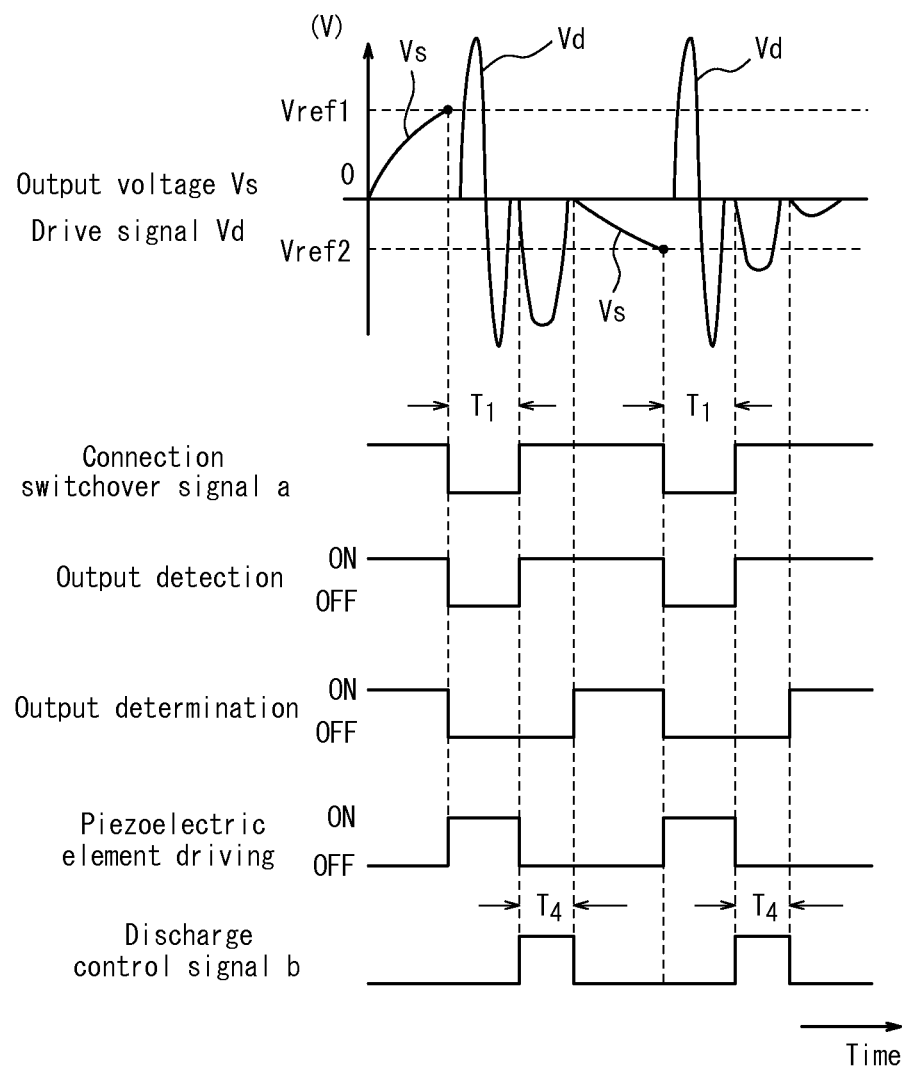
FIG. 7 is a timing chart illustrating a schematic operation of an input apparatus according to Embodiment 3 of the present invention.

FIG. 7 is a timing chart illustrating a schematic operation of an input apparatus according to Embodiment 3 of the present invention. The input apparatus according to the present embodiment has the configuration illustrated in FIG. 5 and provides the tactile sensation also when the pressing object is released from the touch face of the panel 11. To that end, the output detection unit 18 has a first standard voltage Vref1 corresponding to the standard load for providing the tactile sensation during pressing (corresponding to the standard voltage Vref according to Embodiments 1 and 2) and a second standard voltage Vref2 corresponding to a standard load for providing the tactile sensation upon release. The second standard voltage Vref2 has a polarity different from that of the first standard voltage Vref1. The following is a schematic description of the operations of the input apparatus according to the present embodiment with reference to FIG. 5.

First, in a similar manner to the above embodiments, the control unit 17 determines that the position information from the panel 11 indicates input to the input object displayed on the display unit 12 and the output detection unit 18 indicates that the output voltage Vs of the piezoelectric element 13 has satisfied the first standard voltage Vref1 corresponding to the standard load (for example, 1.5 N) for providing the tactile sensation. The control unit 17 then sets the connection switchover signal a to the level L for the predetermined period $T_1$. Thereby, the piezoelectric element 13 is connected to the piezoelectric element drive unit 15 by the switchover control unit 14.

Then, while the piezoelectric element 13 is connected to the piezoelectric element drive unit 15, the control unit 17 controls the piezoelectric element drive unit 15 to output the predetermined drive signal Vd to drive the piezoelectric element 13. The touch panel 11 is thus vibrated and provides a tactile sensation to the pressing object pressing the touch face.

Subsequently, when the predetermined period $T_1$ for driving the piezoelectric element 13 by the piezoelectric element drive unit 15 elapses, the control unit 17 sets the connection switchover signal a to the level H and changes the connection of the piezoelectric element 13 from the piezoelectric element drive unit 15 to the control unit 17. Concurrently, the control unit 17 sets the discharge control signal b to the level H for a predetermined period (discharge period) $T_4$ and discharges the residual electric charge accumulated in the piezoelectric element 13 to ground via the collector-emitter pathway of the switching transistor 42.

In addition, the control unit 17 sets detection of output voltage by the output detection unit 18 to a resumable state at the point at which the predetermined period $T_1$, in which the connection switchover signal a switches from the level L to the level H, elapses. However, the determination of the output voltage is not performed from the point at which the predetermined period $T_1$ elapses until the point at which the predetermined period $T_4$, in which the discharge control signal b is at the level H, elapses. Then, from the point at which the predetermined period $T_4$ elapses, the control unit 17 causes the output detection unit 18 to resume the determination of the output voltage Vs from the piezoelectric element 14. In order to retain the state in which the panel 11 is pressed by the pressing object, the predetermined period (discharge period) $T_4$ is set to be shorter than the predetermined period $T_3$ according to Embodiment 2, for example approximately 20 ms.

Here, since the piezoelectric element 13 is connected to ground for the predetermined period $T_4$ to discharge the residual electric charge, the output voltage Vs of the piezoelectric element 13 is 0 V at the end of the predetermined period $T_4$. Accordingly, if the panel 11 is pressed by the pressing object at this point, the output voltage Vs of the piezoelectric element 13 is 0 V in such a pressed state. As a result, when the piezoelectric element 13 is displaced to return to an original state in accordance with release of the pressing object, the output voltage of the piezoelectric element 13 increases to the negative polarity side in accordance with the displacement.

Then, after the predetermined period (discharge period) $T_4$ elapses, the output detection unit 18 in the control unit 17 determines that the output voltage Vs of the piezoelectric element 13 has satisfied the second standard voltage Vref2 corresponding to the standard load for providing the tactile sensation upon release. Similarly to during the above-described pressing, the control unit 17 then sets the connection switchover signal a at the level L for the predetermined period $T_1$ and changes the connection of the piezoelectric element 13 from the control unit 17 to the piezoelectric element drive unit 15.

Then, similarly to during the above-described pressing, while the piezoelectric element 13 is connected to the piezoelectric element drive unit 15, the control unit 17 controls the piezoelectric element drive unit 15 to output the predetermined drive signal Vd to drive the piezoelectric element 13. The touch panel 11 is thus vibrated and provides a tactile sensation to the pressing object pressing the touch face.

Subsequently, similarly to during the above-described pressing, the control unit 17 sets the connection switchover signal a to the level H, changes the connection of the piezoelectric element 13 from the piezoelectric element drive unit 15 to the control unit 17, and maintains the discharge control signal b at the level H for the predetermined period (discharge period) $T_4$. The residual electric charge accumulated in the piezoelectric element 13 is thereby discharged. Also similarly to during the above-described pressing, the control unit 17 sets detection of output voltage by the output detection unit 18 to a resumable state at the point at which the predetermined period $T_1$, in which the connection switchover signal a switches from the level L to the level H, elapses. However, the determination of the output voltage is not performed from the point at which the predetermined period $T_1$ elapses until the point at which the predetermined period $T_4$, in which the discharge control signal b is at the level H, elapses. Subsequently, from the point at which the period $T_4$ for discharge by the discharge circuit 16 elapses, the control unit 17 causes the output detection unit 18 to resume the determination of the output voltage Vs of the piezoelectric element 14 in preparation for the next touch input.

The input apparatus according to the present embodiment achieves the same effect as the above embodiments. According to the present embodiment, in addition, since the tactile sensation is provided also when the pressing object is released from the panel 11, it is possible to provide a realistic operation sensation of a push-button switch such as a metal dome switch. That is, it is possible to provide a realistic click sensation "Cli" obtained when the metal dome buckles during pressing as well as a realistic click sensation (in this case, a release sensation) "Ck" obtained when the metal dome recovers from buckling upon being released. It is to be appreciated that the drive signal for the release sensation does not necessarily need to be the same as that for the click sensation. The tactile sensations "Cli", "Ck", "Click", the "throbbing" sensation, the "jelly-like" sensation and the "vibrating" sensation set forth in the present specification are descriptions in Japanese of sensations obtained by the operator. Examples of the drive signals for providing actual tactile sensations are set forth above.

Here, although the standard for providing the release sensation may be set to be the same as the voltage standard corresponding to the above-described standard load for providing the click sensation during pressing (for example, 1.5 N), it is preferable to set the standard load for providing the release sensation to be a lower value that is 50-80% of the load for providing the click sensation during pressing (for example, 1 N). By doing so, the timing for providing tactile sensations is synchronized with the timing of sequential inputs when the same position (input object) is repetitively input (tapped), thereby providing a realistic click sensation without a feeling of strangeness. That is, setting the standard load for providing the tactile sensation upon release to be smaller than that during pressing allows for prevention of a feeling of strangeness. In addition, setting the standard load for providing the tactile sensation upon release to be approximately 50% or more of that during pressing contributes to a significant improvement in operability during repetitive input. Moreover, setting the standard load for providing the tactile sensation upon release to be approximately 80% or less of that during pressing allows for response to a faint load change in a holding state during repetitive input.

It is to be understood that the present invention is not limited to the embodiments set forth above and various changes may be implemented within the spirit of the present invention. For example, the switching transistor 42 of the discharge circuit 16 illustrated in FIG. 5 may include a semiconductor relay or the like. In addition, the piezoelectric element 13 may have a known configuration such as monomorph, unimorph, bimorph or a laminated type, based on the area, vibration amplitude and the like of the panel 11.

The present invention can also be applied effectively to an input apparatus in which the panel functions as a touch switch for ON/OFF operations. The input apparatus according to the present invention drives the piezoelectric element when the output of the piezoelectric element satisfies the standard for providing the tactile sensation. Here, "when the output of the piezoelectric element satisfies the standard for providing the tactile sensation" may be any of "when the output of the piezoelectric element reaches a standard value for providing the tactile sensation", "when the output of the piezoelectric element exceeds the standard value for providing the tactile sensation", or "when the standard value for providing the tactile sensation is detected based on the output of the piezoelectric element".

Furthermore, in the above embodiments, the "output of the piezoelectric element" has been described as an output voltage, but the present invention is not limited in this way. The "output of the piezoelectric element" may be an output current or an output power.

REFERENCE SIGNS LIST

11: Panel
11*a*: Touch surface
12: Display unit
13: Piezoelectric element
14: Connection switchover unit
15: Piezoelectric element drive unit
16: Discharge circuit
17: Control unit
18: Output detection unit
31: Housing
32: Insulator
33: Upper cover
34: Insulator
42: Switching transistor

The invention claimed is:

1. An input apparatus comprising:
   a panel;
   a piezoelectric element mounted on the panel;
   an output detection unit configured to detect an output of the piezoelectric element corresponding to pressure on a touch face of the panel and to determine whether the output satisfies a standard for providing a tactile sensation;
   a piezoelectric element drive unit configured to drive the piezoelectric element so that when the output detection unit determines that the output satisfies the standard, the tactile sensation is provided to an object pressing the touch face; and
   a control unit configured to control a start timing of the determination by the output detection unit, wherein
   the output detection unit enters a resumable state after the piezoelectric element drive unit drives the piezoelectric element, and
   the control unit controls the output detection unit to resume the determination when a predetermined period elapses after the output detection unit enters the resumable state.

2. The input apparatus of claim 1, further comprising a discharge circuit configured to discharge residual electric charge accumulated in the piezoelectric element, wherein
   the discharge circuit discharges, in the predetermined period, the residual electric charge accumulated in the piezoelectric element.

3. The input apparatus of claim 1, wherein
   the predetermined period is 40 ms or less.

4. A control method for an input apparatus, the input apparatus including:
   a panel;
   a piezoelectric element mounted on the panel;
   an output detection unit configured to detect an output of the piezoelectric element corresponding to pressure on a touch face of the panel and to determine whether the output satisfies a standard for providing a tactile sensation; and
   a piezoelectric element drive unit configured to drive the piezoelectric element so that when the output detection unit determines that the output satisfies the standard, the tactile sensation is provided to an object pressing the touch face,
   the piezoelectric element being selectively connected to one of the output detection unit and the piezoelectric element drive unit,
   the control method comprising the steps of:
   while the piezoelectric element is connected to the output detection unit, switching connection of the piezoelectric element from the output detection unit to the piezoelectric element drive unit and driving the piezoelectric element with the piezoelectric element drive unit when the output detection unit determines that the output satisfies the standard;
   after driving of the piezoelectric element, switching connection of the piezoelectric element from the piezoelectric element drive unit to the output detection unit such that the output detection unit enters a resumable state; and
   controlling the output detection unit to resume the determination when a predetermined period elapses after the output detection unit enters the resumable state.

* * * * *